United States Patent
Chaudhuri et al.

(10) Patent No.: US 7,958,114 B2
(45) Date of Patent: Jun. 7, 2011

(54) DETECTING ESTIMATION ERRORS IN DICTINCT PAGE COUNTS

(75) Inventors: Surajit Chaudhuri, Redmond, WA (US); Vivek Narasayya, Redmond, WA (US); Ravishankar Ramamurthy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 12/098,178

(22) Filed: Apr. 4, 2008

(65) Prior Publication Data

US 2009/0254522 A1 Oct. 8, 2009

(51) Int. Cl.
*G06F 7/00* (2006.01)
*G06F 17/30* (2006.01)

(52) U.S. Cl. .......................................................... 707/719
(58) Field of Classification Search .......................... None
See application file for complete search history.

(56) References Cited

OTHER PUBLICATIONS

Stillger et al., "LEO—DB2's Learning Optimizer", Proc. of the 27th VLDB Conference, 2001, ACM.*

* cited by examiner

*Primary Examiner* — Michael Hicks

(57) ABSTRACT

A database server may be configured to compute distinct page counts of pages accessed to execute operands of respective queries. The queries may be executed against a table comprised of the pages and having an index managed by the database server. The distinct page counts may be obtained by counting, as a part of the executing of the queries, distinct pages accessed during the execution of the queries.

21 Claims, 9 Drawing Sheets hash join

DETECTING ESTIMATION ERRORS IN DICTINCT PAGE COUNTS

BACKGROUND

Over time, databases have been gradually refined for improved performance. Small optimizations have accumulated to enable databases to perform efficiently and get the most out of available resources. When a query is executed by a database server or engine, there may be many different ways for the database server to perform the query. Some operations may be performed before others. Some tables might be queried before others. Joins might be performed in different orders or using different join methods. There may be different indices to choose from. To help a database server choose an optimal way of executing a query, cost models are often used. Cost models are statistical models that can be used to estimate execution costs for different query plans. Cost models have traditionally taken into account a number of parameters such as memory, distribution of values in the database, indices, historical workload statistics, and many others. Previously, database servers have not measured information about the number of distinct pages accessed for a query.

Discussed below are techniques related to efficiently computing distinct page counts using execution feedback, and using same to improve database performance.

SUMMARY

The following summary is included only to introduce some concepts discussed in the Detailed Description below. This summary is not comprehensive and is not intended to delineate the scope of the claimed subject matter, which is set forth by the claims presented at the end.

A database server may be configured to compute distinct page counts of pages accessed to execute operands of respective queries. The queries may be executed against a table comprised of the pages and having an index managed by the database server. The distinct page counts may be obtained by counting, as a part of the executing of the queries, distinct pages accessed during the execution of the queries.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
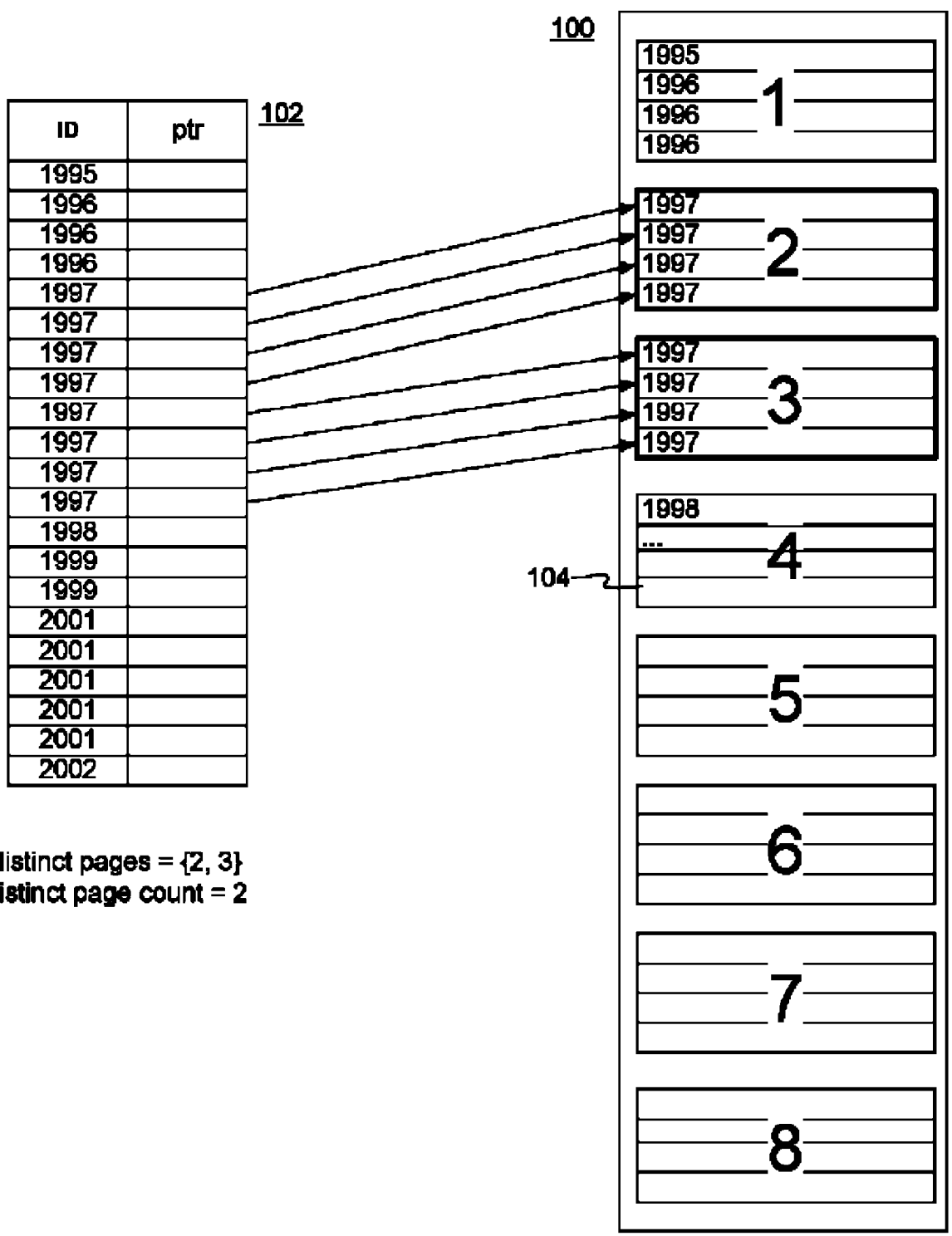
FIG. 1 shows a database table and an accompanying non-clustered index.

FIG. 1 shows a database table 100 and an accompanying non-clustered index 102. As with most modern databases, the table 100 is segmented into storage units usually referred to as pages 104. In the example of FIG. 1, the table 100 has 4 rows per page 104. Among other possible columns the table 100 has a "year" column. The index 102 has pointers to corresponding rows in the table 100. In this example, the rows in table 100 happen to be ordered by year. In a live database, this might happen if data is loaded into the table 100 in batches, for example, by the year. In this case, while the rows, if dated, might not be in chronological order, they are arranged in clusters. The effect can be seen if a query is made for all rows having the "year=1997". In this case, only two distinct pages are fetched from table 100; the pages with page IDs (PIDs) 2 and 3. Contrast this query with a similar query of the table in FIG. 2.

Figure 2:
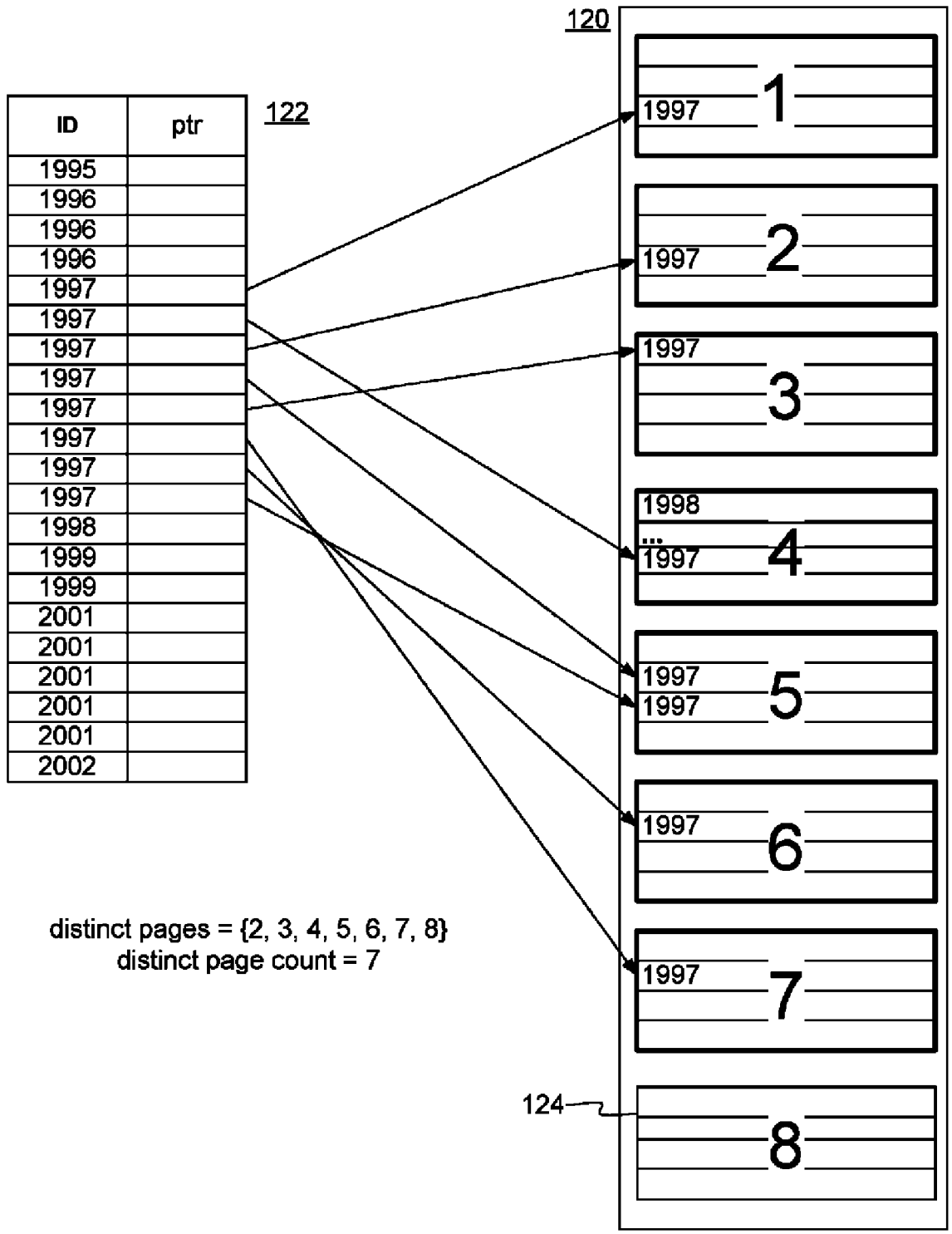
FIG. 2 shows another database table and an accompanying non-clustered index.

FIG. 2 shows another database table 120 and an accompanying non-clustered index 122. The table 120 is divided into pages 124. In this example, the rows in table 120 were loaded in some order independent of the year column. Therefore, the year values are distributed randomly across the table 120. If table 120 is queried for all rows where "year=1997", pages 2, 3, 4, 5, 6, 7, and 8 must be fetched. While the same query in FIG. 1 requires two different pages to be fetched, the query in FIG. 2 requires 7 distinct pages to be fetched. Previously, cost estimates for potential query plans for a query have not taken into account information obtained using execution feedback regarding how many distinct pages have been previously accessed to perform a query (or an operation that is part of a query's execution plan). Furthermore, there has been no work on how to efficiently obtain information about distinct page accesses during execution of queries.

Figure 3:
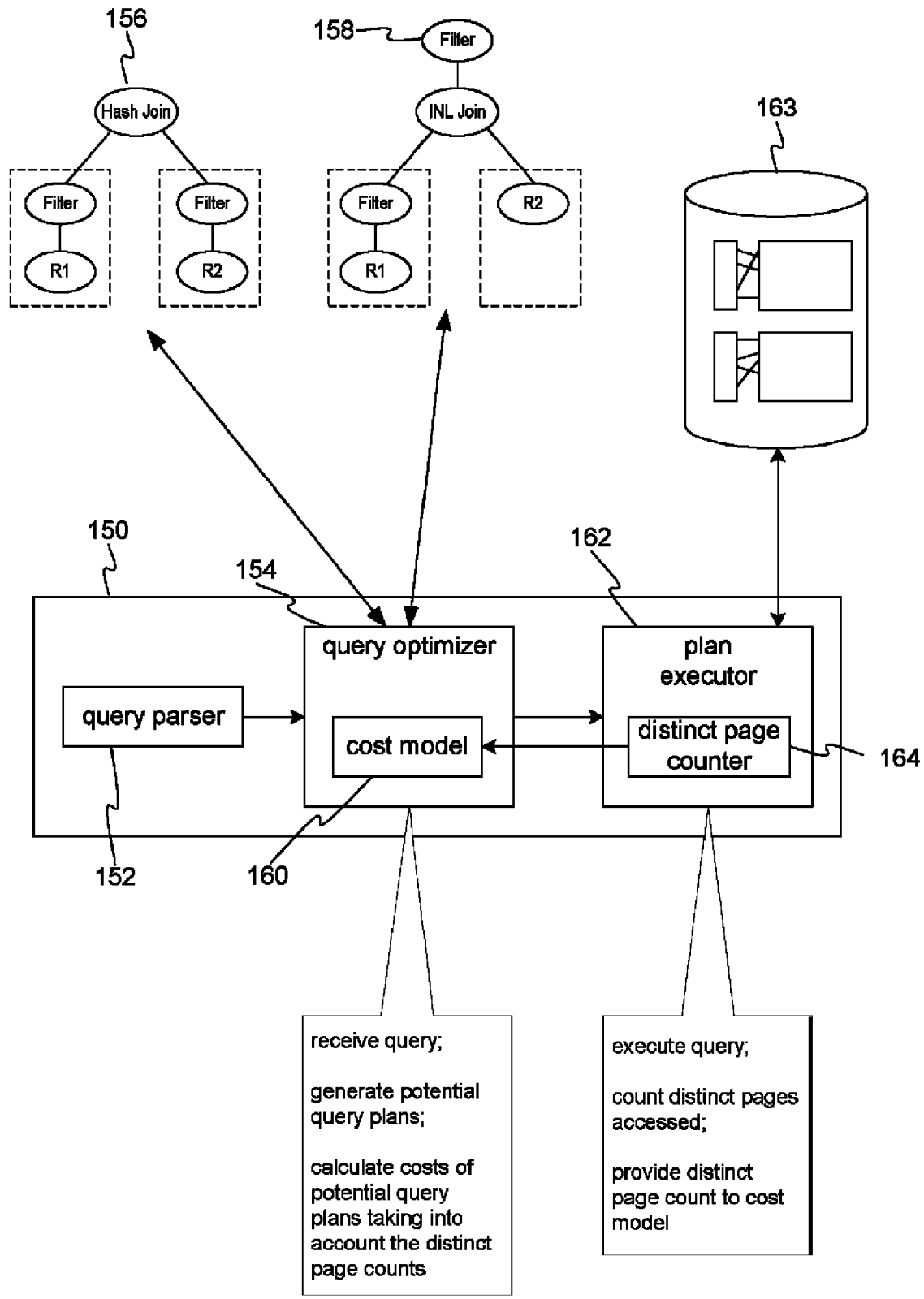
FIG. 3 shows a database engine or server configured to obtain and use information about distinct page counts.

FIG. 3 shows a database engine or server 150 configured to obtain and use information about distinct page counts. The database server 150 is a generic example, and those in the field of database design will appreciate that the database server 150 may vary in architecture and division of functionality. Nonetheless, basic functions such as query parsing, query plan generation, query optimization, and query execution may be assumed. Other functions such as rewriting of queries may also be present. In the example of FIG. 3, the database server 150 has a query parser 152 which parses incoming query strings, checks their format and syntax, resolves names and references in the queries, and converts them to an internal representation. These internal representations are passed to a query optimizer 154. The query optimizer takes the internal representation of a query and attempts to find an efficient or optimal execution plan. A query plan is an object or data structure where table data flows between nodes representing query operators. FIG. 3 shows two example query execution plans 156, 158 that could satisfy a same query. The query optimizer 154 uses a cost model 160 to determine probable costs of executing different execution plans such as plans 156, 158. Cost models or cost estimation functions can take many parameters into account to estimate a cost of executing a query plan. In one embodiment described herein, the most model takes into account information about counts of distinct pages accessed (or estimated to be accessed by sampling) during executions of previous queries. Finally, the database server 150 may also have a plan executor 162 for executing a query plan against a database 163 having one or more tables and indexes. The plan executor 162 may have a distinct page counter 164, which is a module or code that counts distinct pages accessed when a query (or operator) is executed. The plan executor 162 may return page count information to the cost model 160, which may be in the form of statistics about the page counts; the page count information serves as part of the statistical base used by the cost model 160. Additionally or alternatively, the plan executor 162 might output count information as an XML file or as a human-readable report. Further details of obtaining and using distinct page count information will be explained next.

Figure 4:
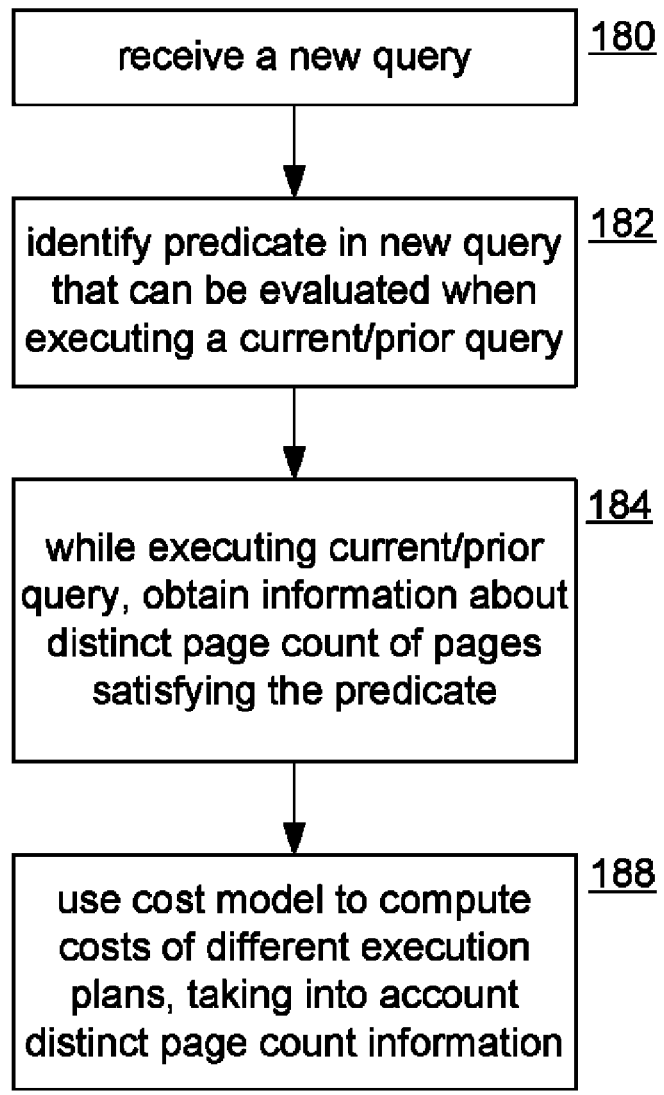
FIG. 4 shows a general approach for obtaining and using distinct page counts.

FIG. 4 shows a general approach for obtaining and using distinct page counts. When a new query is received 180, a predicate in the query is identified 182 that can be evaluated when executing a current query. While executing such query, information about the distinct page count is obtained 184 (e.g., by testing rows of pages). The distinct page count information is used 188 by the cost model 160 to compute costs of different execution plans. Note that the term "distinct page count" is defined herein to include more than a literal count of distinct pages. This term is deemed to also include other information that may reflect or be based on an actual count of distinct pages. For example, a distinct page count might be a ratio, a probability, a metric weighted by multiple factors including literal page count, an extrapolated count of a distinct page count based on a statistical sampling of accessed pages, a scalar value, or any other information derived from and reflecting counts of distinct pages accessed during query execution. A distinct page count will preferably be associated with a specific query expression that accesses a corresponding index (e.g., an index seek or an index nested loops join).

To elaborate, a distinct page count (DCP) parameter represents the number of distinct physical pages of a table that need to be fetched by a query operator. Pages are storage units manipulated by a database memory manager. Each distinct page needed for a plan involves a new logical I/O and if the page is not already buffered, it can result in a physical I/O (a random access to disk), thereby significantly impacting the I/O cost for the query operator. The distinct page count parameter is defined with respect to a predicate expression (e.g., Shipdate='06-01-07'). For a Table Scan operator, the distinct page count may be equal to the number of pages in the table and can be obtained from the table's catalog. The distinct page count parameter is particularly relevant for costing (i.e., estimating a query execution cost of) access methods such as Index Seek and Index Intersection plans as well as the Index Nested Loops join method. Techniques for computing distinct page counts for these methods are described below. First, some definitions are set forth.

Consider a predicate expression p defined on a set of tables including T. For a page PID in the table T, Satisfies(T, PID, p) is true if and only if there exists a tuple in T belonging to page PID that satisfies p. The predicate p can include selection predicates as well as join predicates on the table T. For a given table T and predicate expression p, DPC(T, p) is defined to be the count of PIDs in T for which Satisfies(T, PID, p) is true. That is to say, DPC(T, p) may be the number of pages having one or more rows that satisfy the predicate p.

Generally, the distinct page count is relevant in a cost model if there exists an index that can be used to evaluate the predicate expression p, for example, for costing (i.e., computing the cost of) a Fetch operator following Index Seek, Index Intersection or Index Nested Loops join operators (in this case p is the join predicate). Distinct page counts might be most useful with non-clustered indexes.

Obtaining Distinct Page Counts from Query Execution

As mentioned earlier, obtaining accurate distinct page counts is relevant for costing known access methods such as the Index Seek and Index Intersection as well as the Index Nested Loops Join method. In one embodiment, a current execution plan, which may be a different plan such as Table Scan or a Hash Join, may be leveraged to obtain the distinct page count. Consider access methods and join methods.

Regarding access methods, consider an example table Sales(Id, Shipdate, State, VendorId). Suppose there are two non-clustered indexes on (Shipdate, State) and (State) respectively. The relevant distinct page counts are DPC(State, State='CA') and DPC(Sales, Shipdate='06-01-07' and State='CA'). If a current query execution plan involves a Table Scan of the Sales table, then DPC(Sales, State='CA') can be obtained from query execution. Because a Table Scan operator scans all pages of a table, Satisfies(Sales, PID, State='CA') may be evaluated for every page of the Sales table. In fact, it is possible to compute DPC(Sales, p) where p is any predicate expression (as will be described in detail further below). Thus, given a Table Scan plan, it is possible to detect the accurate distinct page count that is relevant for costing any Index Seek plan.

Suppose the current plan is an Index Seek plan using the non-clustered index (Shipdate, State). Because the predicate State='CA' is likely only evaluated for rows that satisfy (Shipdate='06-01-07'), all the pages for which Satisfies(Sales, PID, State='CA') is true might not be accessed. Thus, DPC (State, State='CA') might not be computable in this case. However, DPC(T, (Shipdate='06-01-07' and State='CA')) can be computed from the Index Seek plan above. Therefore it is possible to detect the accurate distinct page count of the current Index Seek plan itself. This can be useful to determine if the Table Scan plan has lower cost than the current Index Seek plan.

Regarding join methods, the distinct page count is relevant if an index exists on the join attribute, in which case the distinct page count is useful for costing the Index Nested Loops join method, as explained in the following example.

Consider a join query between two tables R1 and R2, shown in execution plans 156, 158 in FIG. 3. Suppose there is a non-clustered index on the join column of R2. In the Hash Join plan 156, the filters on R1 and R2 are executed inside the respective scan operators for R1 and R2 and the Hash Join operator is executed in a relational engine (RE). In order to accurately estimate the cost of the Index Nested Loops (INL) plan 158, it may be necessary to know the number of distinct pages of R2 that will be fetched by the INL join method. A significant error in the query optimizer 154 estimate for this parameter can result in choosing a sub-optimal plan, for example choosing the Hash Join plan 156 when the INL join plan 158 would execute in less time. Consequently, it may be necessary to estimate the number of pages of R2 for which Satisfies(R2, PID, Join-Pred) is true, where Join-Pred is the join predicate between the relations R1 and R2. Note that the current execution can either be Hash Join or INL join. As with the case of access methods, the distinct page count that can be obtained from a plan is a function of the join algorithm used. Consider the case when the plan is Hash Join. Although the predicate Join-Pred is evaluated in the Hash Join operator, the PID values of R2 are not available in the relational engine layer. In the scan of R2, even though PID values are available, the predicate Join-Pred has not yet been evaluated. Obtaining page counts for join methods is described further below.

Exploiting Distinct Page Counts Obtained from Query Execution

Database engines or database management systems (DBMSs) commonly are able to output information monitored during query execution. For example, in Microsoft's SQL Server, such monitored information can be exposed by Dynamic Management Views (DMVs) or via a statistics xml mode. In the statistics xml mode the server returns, for each operator in a plan, the actual and estimated cardinalities. The statistics xml mode (or similar functionalities in other DBMS products) can be extended to output the relevant distinct page counts for access methods and join methods. While efficient mechanisms for obtaining distinct page counts are emphasized herein, the page counts, once obtained, can be leveraged in different useful ways, including the above-mentioned costing of query plans. For example, distinct page counts can serve as a useful performance debugging tool for a database administrator (DBA). The DBA might examine the distinct page count that is relevant for a particular index and compare it with an optimizer estimated value. If the values are significantly different, the DBA can correct the problem using hinting mechanisms to force a better plan (e.g., force an Index Seek plan instead of a Table Scan plan). Furthermore, if the optimizer exposes an interface to feed the accurate page count values back into to the cost model, the DBA or a client diagnostic/tuning tool can estimate the cost of alternative plans and recommend an appropriate plan hint.

Page counts obtained from query execution can also be integrated into a comprehensive feedback-based infrastructure that can enable the query optimizer to "learn" about errors in its cost estimates and can correct execution plans. As described elsewhere, such feedback information may be gathered in the form of (expression, cardinality) pairs from the output of each operator in a query execution plan. The framework can be augmented to capture feedback information of the form (expression, cardinality, distinct page counts) for appropriate expressions in the query execution plan. Such a framework can enable reusing the accurate distinct page count for similar queries. Such feedback gathered can also be potentially used to refine histograms for page counts similar to prior work on self-tuning histograms.

Obtaining Distinct Page Counts for Single Table Access Methods

Single table access plans may be either scan plans or index plans. Index plans include: (a) Index Seek: Lookup a non-clustered index followed by a Fetch from the table; and (b) Index Intersection: Lookup two or more non-clustered indexes, intersect the RIDs obtained from each index, followed by a Fetch from the table of the qualifying rows. Scan plans include: (a) Heap Scan; (b) Clustered Index Scan; and (c) Scan of a Covering Index (i.e. an index that includes all the columns in the table that are required by a query). Page counting methods for index planes will now be described, followed by description of scan plans.

Figure 5:
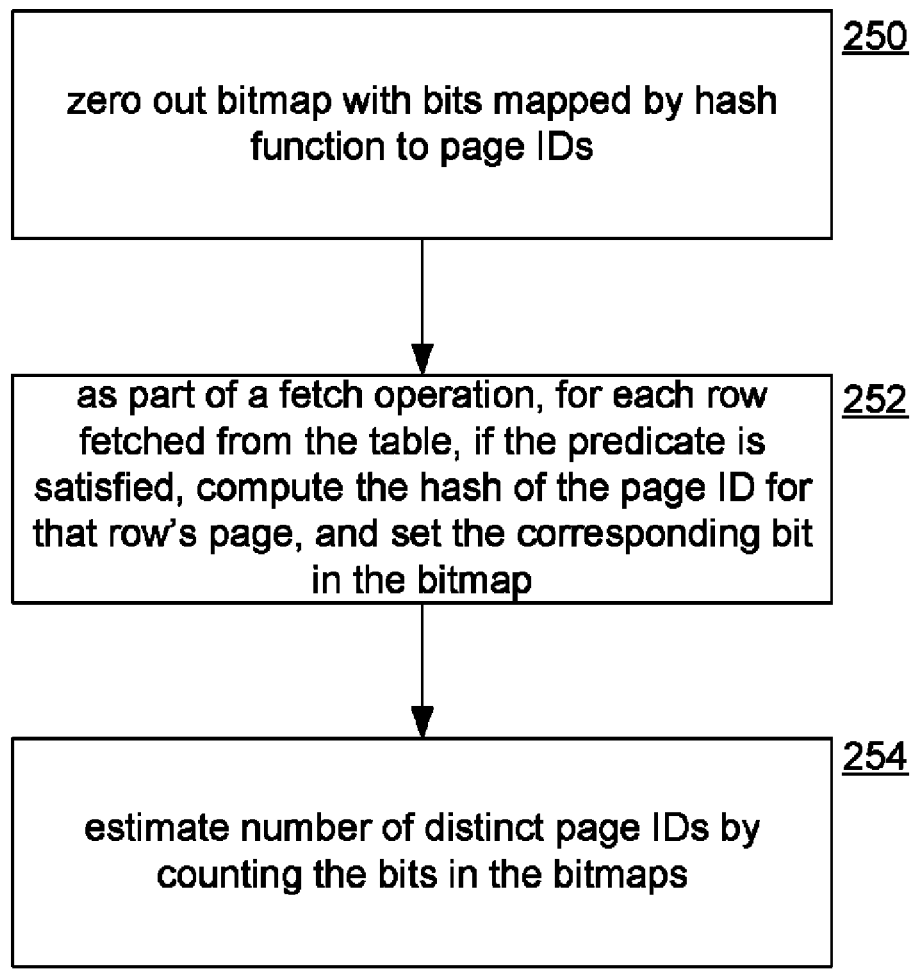
FIG. 5 shows an overview of a general process for computing distinct page counts for execution of index plans.

FIG. 5 shows an overview of a general process for computing distinct page counts for execution of index plans. A bitmap is used to count distinct pages accessed by providing a hash function to map page IDs (PIDs) to particular bits in the bitmap. When an operation is executed, the bitmap is zeroed 250. As part of a fetch operation, for each row fetched from the table, if the predicate being counted is satisfied by the row, then the hash of the PID is computed for that row's page and the corresponding bit in the bitmap is set. Having been set, further hits to that PID's bit will not affect the total number of bits that have been set. Thus, the number of distinct pages can be estimated 254 by counting the number of bits set in the bitmap; the set bits representing a cardinality of accessed pages that satisfied the predicate. In one embodiment, the distinct page count can be in the form of: (the number of bits set to one)*−1*ln(number of zero bits/number of total bits).

Figure 6:
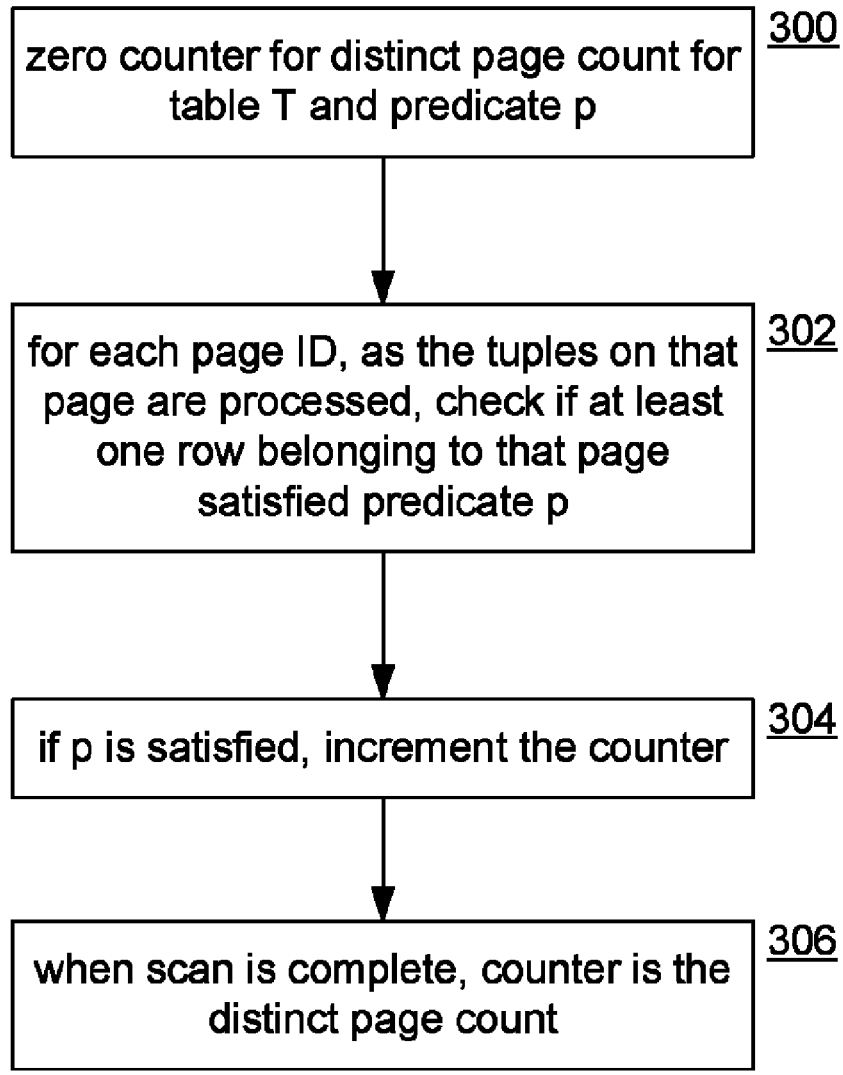
FIG. 6 shows a general process for finding distinct page counts for scan plans.

FIG. 6 shows a general process for finding distinct page counts for scan plans. A counter is provided, which is initially zeroed 300. For a scan of table T and predicate p, for each PID, as the tuples on that page are processed, the process checks 302 if at least one row of that page satisfies predicate p. If p is satisfied 304, then the counter is incremented. When the scan is complete 306, the counter can serve as the basis for a distinct page count. This technique may be used in view of the following.

For scan plans, e.g., a Heap Scan or Clustered Index/Covering Index Scan, a grouped page property described holds true. Thus if two successive tuples have PID values of PID1 and PID2 respectively (PID1*PID2), then no further tuples in the scan will have the value PID1. As a result, duplicate PIDs are not a concern. Thus, for scan plans the problem of distinct page counting (DPC (T, p)) reduces to counting the number of pages for which Satisfies(T, PID, p) is true.

To elaborate, a counter for DPC (T, p) is initialized to 0. For each page PID, as the tuples on that page are processed, a check is made to see if at least one row belonging to that page satisfies the predicate p. If so, the counter is incremented. At the end of the scan, the value of the counter is the value of DPC(T, p). If the predicate p is indeed evaluated on every row as part of query execution, then this method is efficient—using one additional counter and a single comparison for each row (to determine if the row passed the predicate). However, the current plan may not evaluate the predicate p on every row. This is due to the use of the well known performance optimization technique of predicate short-circuiting, which the following example will illustrate.

Consider a query whose predicates are (Shipdate='06-01-07' and State='CA') (see the example Sales table and indexes discussed earlier). Suppose the current execution plan is Table Scan and the query's two predicates are evaluated in left to right order. Consider the case when a non-clustered index on (State) is present. To accurately estimate the cost of a plan that uses the index (State), it is helpful to estimate the number of distinct pages for which Satisfies(Sales, PID, State='CA') is true, i.e., DPC(Sales, State='CA'). However, a predicate evaluator typically resorts to predicate short-circuiting for efficiency. In this example, if the predicate (Shipdate='06-01-07') evaluates to FALSE for a row, the remaining predicates are not evaluated for that row. In other words, the predicate State='CA' may not be evaluated for each row of the table.

Note that in the above example, if the predicate for which the page counts are required was either (Shipdate='06-01-07) or (Shipdate='06-01-07' and State='CA'), turning off predicate short-circuiting is not required. For a sequence of conjunctive predicates, there is no need to turn off predicate short-circuiting to obtain the distinct page count corresponding to any prefix of the predicates. However, if the page counts are required for a predicate that is not a prefix of the predicates evaluated, it may be necessary to turn off the predicate short-circuiting optimization. But, turning off predicate short-circuiting can result in non-trivial overheads. To mitigate the overhead incurred by turning off predicate short-circuiting, an algorithm for distinct page counting based on page sampling may be used, as discussed next.

A compromise may be reached by estimating the number of pages for which Satisfies (T, PID, p) is true. When the grouped page property holds, the problem of distinct page counting reduces to a simpler problem of counting for which we can leverage the technique of uniform random sampling over the pages of the table. This technique can help reduce the overheads while still ensuring accurate estimation. Consider FIG. 7, showing a process as outlined above that executes as part of the Scan operator.

Figure 7:
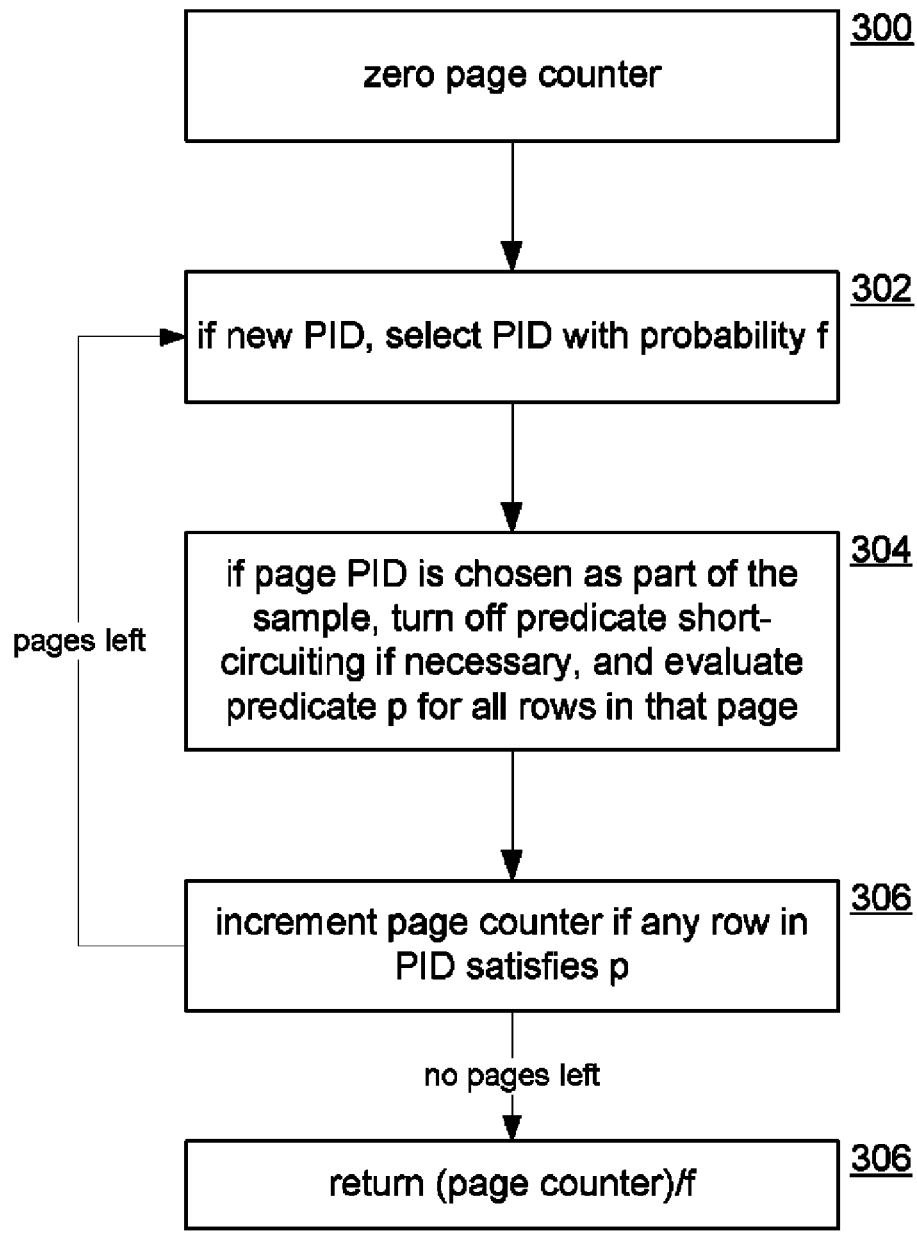
FIG. 7 shows a process for estimating a count of distinct pages for a scan plan by using sampling.

FIG. 7 shows a process for estimating a count of distinct pages for a scan plan by using sampling. A counter is provided for a scan operation. The counter is zeroed 300. As the rows and pages of the relevant table are scanned, when a new PID is encountered, the PID is selected 302 with a probability of f (meaning, there is probability f that the newly encountered page will be selected 302). If the page is selected 302, then predicate short-circuiting is turned off 304, and predicate p is evaluated for all rows in that page. The counter is incremented 306 if any row in the PID page satisfies p. When no pages are left, a result is returned 306, namely the counter divided by f (i.e. the sample-extrapolated estimate of distinct pages that would be accessed by the query).

Obtaining Distinct Page Counts for Join Methods

As mentioned above, it may be useful to compute distinct page counts for join methods. Techniques for Indexed Nested Loops will be described first, followed by discussion of techniques for Hash Joins and Merge Joins, any of which might be potentially chosen by a query optimizer to carry out a join operation.

For the case of an Index Nested Loop Join, consider the case when the current plan is an INL join plan (see plan 158 in FIG. 3). After looking up the index on the join column of R2, the order in which the rows to be fetched from the R2 table appears similar to the case of an Index Seek plan. Therefore, to obtain a distinct page count, the probabilistic counting technique described above with reference to FIG. 5 may be applied.

In the case of a Hash Join, referring to the example above, note that DPC (R2, p) is to be computed, where p is the join predicate. This computation can be non-trivial because although the predicate p is evaluated in the Hash Join operator, the PID values of R2 are not available there. In the scan of R2, even though PID values are available, the predicate p has not yet been evaluated. This problem can be handled by exploiting the idea of bit vector filtering.

Figure 8:
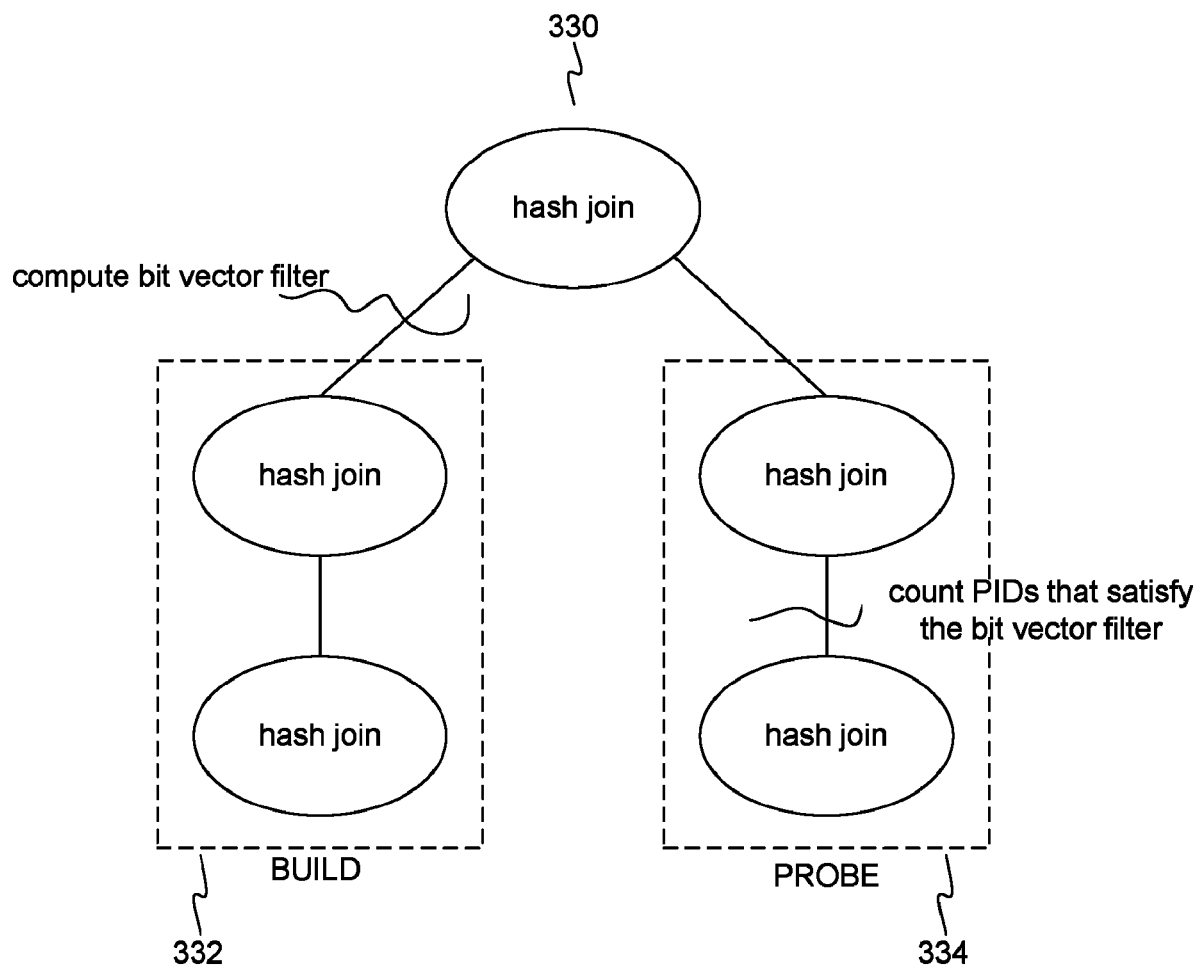
FIG. 8 shows an example hash join plan supplemented with a bit vector filter.
Figure 9:
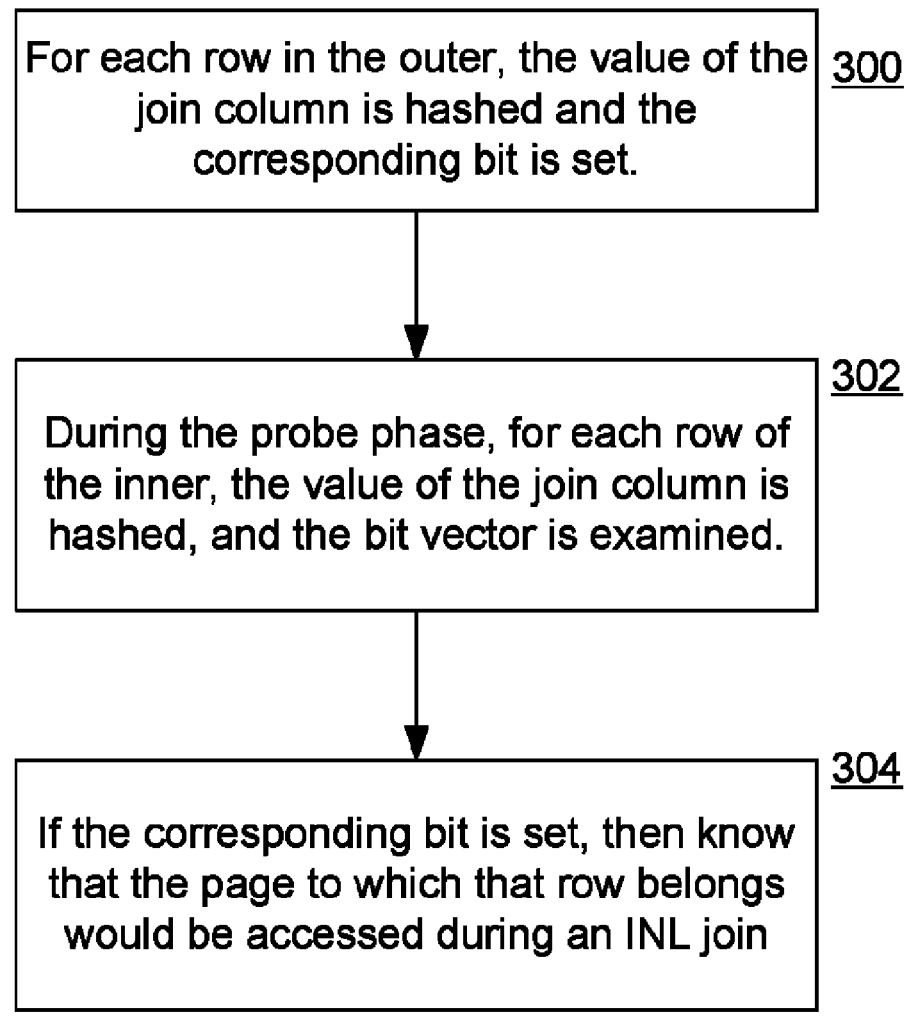
FIG. 9 shows a process for performing a hash join.

FIG. 8 shows an example hash join plan 330 supplemented with a bit vector filter. The plan 330 in FIG. 8 corresponds to the example query discussed above. A bit vector is computed during the build phase 332 of the join. FIG. 9 shows a process for performing a hash join. For each row in the outer, the value of the join column is hashed 300 and a corresponding bit is set in the bit vector. During the probe phase 334, for each row of the inner, the value of the join column is hashed, and the bit vector is examined 302. If the corresponding bit is set, then it is known 304 that the page to which that row belongs would be accessed during an INL join. In effect, the bit vector filter can be used as a "derived" semi-join predicate during the probe phase. Note that the sampling algorithm can also be applied to this case because the probe is a table scan to optimize overheads.

If the number of bits used for the bit vector is at least as many as the number of distinct values of the join column of the outer relation, then the above method should guaranty the exact page count, since there are no false positives due to collisions. If fewer bits are used, then due to collisions the page count can be overestimated. Experiments have shown small overestimation of distinct page count even when using a relatively small number of bits.

Regarding a Merge Join, the idea of bit vector filtering for computing page counts described above is also applicable to a Merge Join when the bit vector for the outer relation can be computed before the inner relation is scanned. This property also holds for Merge Joins where the outer child is a Sort operator, because the first GetNext( ) call to the Sort operator blocks (pauses) and returns only after its child is fully consumed, enabling the construction of the bit vector. Bit vector filtering is also applicable to the case when both inputs are clustered on the respective join columns, i.e., no Sorts on either input. For this case, the partial bit vector filter corresponding to the outer rows consumed thus far can be used during the scan of the inner relation to compute the page count. This is because the Merge Join only advances the pointer of the inner relation if the values of the join column match the outer. Note that partial bit vector filters can also be applied for the case when the outer is not sorted and the inner child is sorted.

Implementation Details

Embodiments discussed above may be implemented with Microsoft SQL Server 2005. For a given query, a set of expressions (e.g., (Shipdate='06-01-07') is an expression) may be taken for which distinct page counts are needed. SQL Server's statistics xml mode may be used, and after the query execution is complete, the server may be configured to output the execution plan in xml format along with additional counters gathered during the query's execution, e.g., cardinality of each operator in the plan. This output may be augmented with the estimated and the actual distinct page count for each requested expression. A method may be implemented so that the distinct page count for a given expression can be inputted to the query optimizer. This allows a DBA or a diagnostic/tuning tool to inject a distinct page count value for an expression and obtain the execution plan by optimizing with the injected page count(s).

If implemented in Microsoft SQL Server, the PID value for a row is only available in the storage engine (SE) (other DBMSs may have functional equivalents). While it is possible to modify the server to expose PID values outside the SE in the relational engine (RE) operators, the engineering complexity as well as performance overheads of such a change can be significant. As predicate evaluation of most predicates (except expensive user defined functions) is usually performed within the SE, changes for turning off predicate short-circuiting may be made in the SE. Information that needs to be passed from SE to RE may be accomplished via callbacks to the RE layer, for instance for utilizing the bit vector filter for Hash Joins.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored digital information can be in the form of machine executable instructions (e.g., compiled executable binary code), source code, bytecode, or any other digital information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A computer implemented method performed by a database engine executing on a computing device, the database engine including a cost function for estimating the respective costs of executing different query plans for executing a requested query, the method comprising:

executing queries by accessing pages, the pages comprising storage units managed by the database engine and which store rows of tables managed by the database engine;

after computing an execution plan for a first query of the queries, while accessing the pages to execute the first query, generating distinct page count information by counting a number of distinct pages accessed by the database engine specifically to execute the first query, where the generating is performed by the database engine, the distinct page count is a count of pages accessed during execution of the first query, the distinct page count not including any pages that were not accessed to execute the query, wherein pages accessed multiple times during and for execution of the first query are only counted one time in the distinct page count.

2. A method according to claim 1, further comprising:

from among a plurality of candidate execution plans for executing a second query of the queries, choosing one of the execution plans based on an estimated cost of the execution plan, where the estimated cost is computed by the cost function based at least in part on the distinct page count information generated while accessing the pages while executing the first query.

3. A method according to claim 2, wherein the distinct page count information comprises information generated by counting a number of actual distinct pages accessed by the database engine when executing one of the queries.

4. A method according to claim 3, wherein the distinct page count information comprises information generated by sampling a subset of the pages accessed to execute a query and testing the sampled pages to estimate a number of actual distinct pages that would have been accessed to test a predicate of the query.

5. A method according to claim 4, wherein predicate short-circuiting is turned off by the database engine when the sampled subset of pages are accessed to execute the first query and predicate short-circuiting is turned on when non-sampled pages are accessed.

6. A method according to claim 1, wherein the first query is performed by an execution plan comprising a join predicate, and the distinct page count information is obtained by applying a bit vector filter during a build phase of executing the execution plan, and checking the bit vector during a probe phase of executing the execution plan.

7. A method according to claim 1, wherein as a query is performed, checking if at least one row of a current page satisfies a predicate of the query.

8. One or more computer-readable media storing a database server configured to perform a process on a computer, the process comprising:

computing distinct page counts of pages accessed to execute queries, respectively, the queries being executed against a table comprised of the pages and having an index managed by the database server, wherein the distinct page counts comprise information obtained by counting, as a part of the executing of the queries, distinct pages accessed during the execution of the queries, and wherein a distinct Pape count for a query is a count of all of and only the number of distinct different pages accessed when executing the query.

9. One or more computer-readable media according to claim 8, the process further comprising providing the distinct page counts as input to a cost model used by the database server.

10. One or more computer-readable media according to claim 8, the process further comprising:

receiving at a database server a new query, and in response, generating different candidate query execution plans that if executed would answer the query; and computing, costs with the cost model, estimated costs of the query execution plans, where the computing is based in part on the distinct page counts; and selecting and executing one of the candidate execution plans based on the estimated costs.

11. One or more computer-readable media according to claim 8, wherein one of the recorded distinct page counts was generated during a scan of the table by counting how many different pages contained at least one row of the table that satisfied a query predicate.

12. One or more computer-readable media according to claim 8, wherein one of the recorded distinct page counts was generated during execution of an index seek plan.

13. One or more computer-readable media according to claim 8, wherein the process further comprises selectively activating and deactivating predicate short-circuiting in the database server.

14. One or more computer-readable media according to claim 8, wherein one of the queries includes a merge or hash join operation and a bit vector is used to identify rows that would be accessed during an INL join.

15. One or more computer-readable media according to claim 8, wherein one of the queries comprises a join operation and a corresponding distinct page count is computed by probabilistic counting.

16. A computing device comprising:

a database server stored on the computing device, the database server configured to receive a query to be executed against and generate different candidate query execution plans, each of which is capable of satisfying the query, the database server comprising:

a query plan executor configured to count distinct pages of a table accessed via an index of the table when the query plan executor executes a query execution plan, and the query plan executor is configured to store, on the computing device, indicia of the count of the distinct pages, wherein the count of the distinct pages is the number of different individual pages accessed by the query plan executor to execute the query execution plan, and a page accessed by the execution of the query execution plan is counted as one distinct page regardless of how many time the page is accessed.

17. A computing device according to claim 16, wherein the database server further comprises:

a query optimizer configured with a cost estimation model that models costs of performing queries, the query optimizer configured to estimate costs of executing respective query execution plans based on the indicia of the count of the distinct pages obtained using execution feedback.

18. A computing device according to claim 16, wherein the query plan executor counts distinct pages by testing whether a row in a page satisfies a predicate.

19. A computing device according to claim 18, wherein the query plan executor statistically samples a subset of pages accessed when executing a query, determines the count of the distinct pages by determining if the predicate is satisfied by rows of the respective sampled pages and not determining if the predicate is satisfied by rows of unsampled pages.

20. A computing device according to claim 16, wherein the query plan executor is configured such that when it executes a query plan for a first query by fetching pages by scanning a table or seeking on an index, the query plan executor computes the distinct page count by evaluating a predicate against a row of a fetched page.

21. A computing device according to claim 20, wherein the first query involves a join operation and the query plan executor maintains information indicating whether a page to which a row belongs would be accessed during an indexed nested loop join.

* * * * *